United States Patent
Massner et al.

(10) Patent No.: US 9,737,852 B2
(45) Date of Patent: Aug. 22, 2017

(54) CATALYST COMPONENT OF A MOTOR VEHICLE EXHAUST GAS CLEANING SYSTEM AND USE OF A CATALYST COMPONENT

(71) Applicant: Daimler AG, Stuttgart (DE)

(72) Inventors: Alexander Massner, Esslingen (DE);
Inderpal Singh, Livonia, MI (US);
Frank Zimmermann, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/385,649

(22) PCT Filed: Jan. 29, 2013

(86) PCT No.: PCT/EP2013/000256
§ 371 (c)(1),
(2) Date: Sep. 16, 2014

(87) PCT Pub. No.: WO2013/139414
PCT Pub. Date: Sep. 26, 2013

(65) Prior Publication Data
US 2015/0071839 A1    Mar. 12, 2015

(30) Foreign Application Priority Data

Mar. 17, 2012    (DE) .................. 10 2012 005 508

(51) Int. Cl.
*B01J 23/40* (2006.01)
*B01J 23/42* (2006.01)
(Continued)

(52) U.S. Cl.
CPC .......... *B01D 53/94* (2013.01); *B01D 53/945* (2013.01); *B01D 53/9472* (2013.01); *B01J 23/40* (2013.01);
(Continued)

(58) Field of Classification Search
CPC ... B01J 23/40; B01J 23/42; B01J 23/44; B01J 23/56; B01J 35/04; B01J 35/0006
(Continued)

(56) References Cited

U.S. PATENT DOCUMENTS 5,510,086 A * 4/1996 Hemingway ........ B01D 53/945
422/169
6,087,298 A * 7/2000 Sung .................... B01D 53/945
502/303
(Continued)

FOREIGN PATENT DOCUMENTS

JP    2003-184542 A    7/2003
JP    2003-247415 A    9/2003
(Continued)

OTHER PUBLICATIONS

Japanese Office Action issued in Japanese counterpart application No. 2014-561305 dated Oct. 20, 2015, with partial English translation (Nine (9) pages).
(Continued)

*Primary Examiner* — Cam N. Nguyen
(74) *Attorney, Agent, or Firm* — Crowell & Moring LLP

(57) ABSTRACT

A motor vehicle emission control system includes a three zone catalytic converter component having a honeycomb support body with catalytically active coating having a precious metal content applied on the channel walls. The first coating zone extends in the longitudinal direction from the inlet-side end to a first coating boundary and has a first precious metal content. The second coating zone extends in the longitudinal direction from the first coating boundary to a second coating boundary situated downstream from the first coating boundary and has a second precious metal content that is lower than the first precious metal content. The third coating zone extends from the second coating boundary to the outlet-side end and has a third precious
(Continued)

Figure 1:
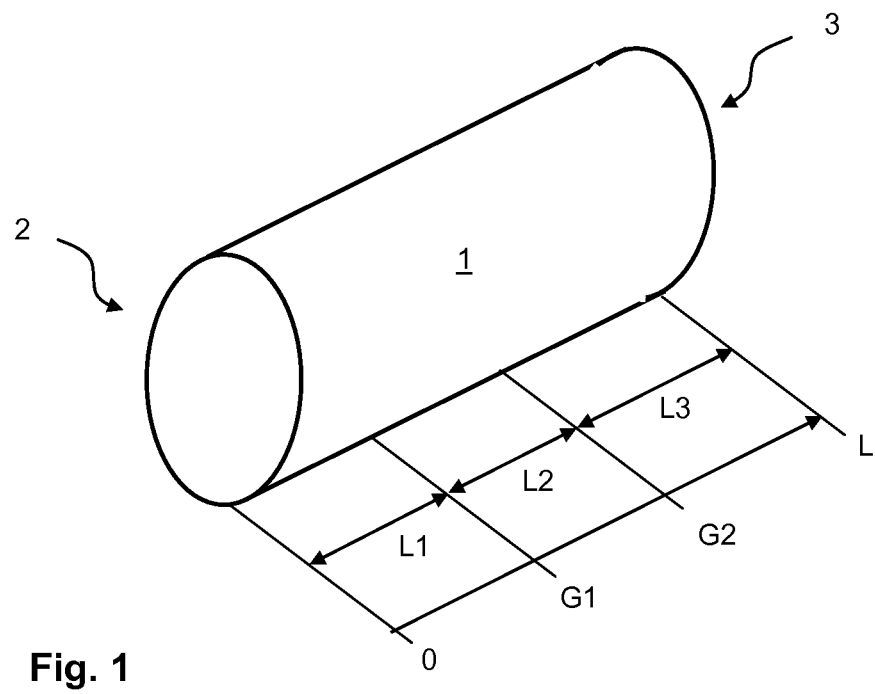

metal content that is lower than the second precious metal content. The coating has oxidation catalyst activity and is free of rhodium.

8 Claims, 2 Drawing Sheets

(51) Int. Cl.
| | |
|---|---|
| *B01J 23/44* | (2006.01) |
| *B01J 23/56* | (2006.01) |
| *B01J 35/00* | (2006.01) |
| *B01J 35/04* | (2006.01) |
| *B01D 53/94* | (2006.01) |
| *F01N 3/10* | (2006.01) |
| *F01N 3/20* | (2006.01) |
| *F01N 3/035* | (2006.01) |
| *B01J 37/02* | (2006.01) |
| *B01J 29/072* | (2006.01) |
| *F01N 13/00* | (2010.01) |
| *B01J 21/04* | (2006.01) |
| *B01J 21/06* | (2006.01) |

(52) U.S. Cl.
CPC ......... *B01J 29/072* (2013.01); *B01J 35/0006* (2013.01); *B01J 35/04* (2013.01); *B01J 37/0246* (2013.01); *F01N 3/035* (2013.01); *F01N 3/106* (2013.01); *F01N 3/2066* (2013.01); *F01N 13/009* (2014.06); *F01N 13/0093* (2014.06); *F01N 13/0097* (2014.06); *B01D 2255/102* (2013.01); *B01D 2255/9035* (2013.01); *B01J 21/04* (2013.01); *B01J 21/066* (2013.01); *F01N 2510/0682* (2013.01); *Y02T 10/22* (2013.01); *Y02T 10/24* (2013.01)

(58) Field of Classification Search
USPC ....... 502/262, 326, 327, 332–334, 339, 355, 502/439, 527.19; 422/170, 177, 180
See application file for complete search history.

(56) References Cited

U.S. PATENT DOCUMENTS

| | | | | |
|---|---|---|---|---|
| 7,329,629 | B2 * | 2/2008 | Gandhi | B01D 53/945 502/304 |
| 7,517,510 | B2 * | 4/2009 | Chen | B01D 53/945 422/168 |
| 7,524,465 | B2 * | 4/2009 | Kumar | B01J 23/44 422/180 |
| 7,550,124 | B2 * | 6/2009 | Chen | B01D 53/945 422/168 |
| 7,745,367 | B2 * | 6/2010 | Fujdala | B01D 53/945 427/419.3 |
| 7,922,988 | B2 * | 4/2011 | Deeba | B01D 53/945 422/168 |
| 7,998,424 | B2 * | 8/2011 | Bergeal | B01D 53/945 422/180 |
| 8,220,251 | B2 * | 7/2012 | Oger | B01D 53/945 422/168 |
| 8,637,426 | B2 * | 1/2014 | Hoke | B01D 53/945 502/333 |
| 2004/0001781 | A1 | 1/2004 | Kumar et al. | |
| 2006/0142153 | A1 | 6/2006 | Endo et al. | |
| 2009/0217652 | A1 | 9/2009 | Bergeal et al. | |
| 2009/0266063 | A1 | 10/2009 | Gandhi et al. | |
| 2010/0290964 | A1 | 11/2010 | Southward et al. | |
| 2011/0099975 | A1 | 5/2011 | Bailey et al. | |

FOREIGN PATENT DOCUMENTS

| | | |
|---|---|---|
| JP | 2006-175386 A | 7/2006 |
| JP | 2011-226356 A | 11/2011 |
| WO | WO 01/74476 A1 | 10/2001 |
| WO | WO 2007/077462 A1 | 7/2007 |
| WO | WO 2012/079598 A1 | 6/2012 |

OTHER PUBLICATIONS

Corresponding International Search Report with English Translation dated May 7, 2013 (four (4) pages).
German-language Written Opinion dated May 7, 2013 (PCT/ISA/237) (four (4) pages).

* cited by examiner

CATALYST COMPONENT OF A MOTOR VEHICLE EXHAUST GAS CLEANING SYSTEM AND USE OF A CATALYST COMPONENT

BACKGROUND AND SUMMARY OF THE INVENTION

Exemplary embodiments of the invention relate to a catalytic converter component of a motor vehicle emission control system, and the use of such a catalytic converter component in an emission control system of a motor vehicle for heating exhaust gas.

PCT publication WO 01/74476 A1 discloses a catalytic converter component designed as a nitrogen oxides trap, which may have three coating zones, situated one downstream from the other, in the exhaust gas flow direction, having a decreasing content of metals of the platinum group. A high nitrogen oxides conversion capability over a wide temperature range is thus achieved.

Exemplary embodiments of the present invention are directed to providing a cost-effective catalytic converter component for a motor vehicle emission control system having a low overall precious metal content but still having high oxidation catalyst activity, in particular at comparatively low temperatures. Further, exemplary embodiments of the present invention are directed to providing an effective option for heating exhaust gas of a motor vehicle, in particular starting from low temperatures.

The catalytic converter component according to the invention includes a support body in a honeycomb design, having channels extending in a longitudinal direction and through which gas may flow freely from an inlet-side end of the catalytic converter component to an outlet-side end of the catalytic converter component. A catalytically active coating having a precious metal content determined by at least one element of the platinum group is applied throughout on the channel walls. A first coating zone extends in the longitudinal direction essentially from the inlet-side end to a first coating boundary situated in the area between the inlet-side end and the outlet-side end. In addition, a second coating zone extends in the longitudinal direction essentially from the first coating boundary to a second coating boundary situated in the area between the inlet-side end and the outlet-side end and downstream from the first coating boundary. In addition, a third coating zone extends in the longitudinal direction essentially from the second coating boundary to the outlet-side end. The coating of the third coating zone has a lower content of precious metals of the platinum group than the coating of the second coating zone, which in turn has a lower content of precious metals of the platinum group than the coating of the first coating zone. The coating of the catalytic converter component is characteristically formed as a coating having oxidation catalyst activity throughout and is free of rhodium. The first coating preferably has at least twice the precious metal content as the coating of the second coating zone, which in turn has at least twice the precious metal content as the third coating provided for the third coating zone. The precious metal content in one of the first and second coating zones is particularly preferably selected to be greater than 2.5 times that in the coating zone that immediately follows. In this regard, a factor of 3.5 is likewise considered to be advantageous.

Due to the zoning according to the invention having zones with a decreasing precious metal content, a comparatively low overall precious metal content may be achieved, whereby on account of the precious metal content that is present at the highest level on the inlet side, a very good light-off characteristic, i.e., a low light-off temperature, is achieved, in particular with regard to oxidation of hydrocarbons. Compared to designs in which a low light-off temperature is achieved by a high precious metal content throughout, the zoning according to the invention has the additional advantage of a reduced tendency toward oxidation of nitric oxide and sulfur dioxide. As a result of the design according to the invention as a catalytic converter component that is free of rhodium, the catalytic converter component can be manufactured in a particularly cost-effective manner. The coating is thus also designed as a coating having oxidation catalyst activity, of which the known three-way catalyst activity, achieved primarily by rhodium, preferably has very little, or at least to a greatly reduced extent. Also preferably absent are coating constituents having a storage effect with respect to nitrogen oxides and/or oxygen, or which are present only to a limited extent as a minor constituent. That is, at best, small fractions of metal compounds, in particular oxides, hydroxides, or carbonates of the alkali and alkaline earth groups, are present. The precious metals of the platinum group that are present, preferably represented primarily or solely by platinum and/or palladium, are finely dispersed or contained in a so-called wash coat that is preferably formed predominantly from the constituents aluminum oxide and/or zirconium oxide. A wash coat free of cerium oxide or which at best contains cerium oxide only to a limited extent is preferably provided. Apart from the outer surface of the honeycomb, the coating is present on all channel walls. The channel walls are preferably impermeable to gas, or at best have low gas permeability. In any case, a filtering effect is preferably present to a negligible extent, if at all.

A "coating extending essentially from the inlet-side end to the first coating boundary" is understood to mean that the first coating zone, apart from manufacturing-related tolerances that may be present, begins directly at the inlet-side end and ends at the first coating boundary. Similarly, the second coating zone, apart from small manufacturing-related tolerances, extends between the first and the second coating boundaries. The third coating zone, apart from small manufacturing-related tolerances, begins at the second coating boundary and extends directly to the outlet end. Thus, no, or at least no appreciable, areas without coating are present, and there is no, or at best negligible, overlap of coatings of the individual coating zones. Therefore, this may be considered to be an essentially overlap-free coating throughout of the catalytic converter component.

The support body is preferably designed as an extruded, one-piece ceramic support. However, a metal support body made of corrugated metal foils may also be provided. In particular in the case of a ceramic support body, the channels have a cross-section that is rectangular and that is at least approximately constant, viewed over the longitudinal direction. However, hexagonal or octagonal cross-sectional shapes may also be provided. The cell density, which is customarily expressed in cells per square inch (cpsi), is preferably in the range of 100 to 600. Cell densities between 200 cpsi and 400 cpsi are particularly preferred.

In one embodiment of the invention, the longitudinal extents of the first and the second coating zones are in each case 10% to 40% of the overall longitudinal extent of the catalytic converter component. The longitudinal extents of the first and the second coating zones are preferably in each case approximately 25% of the overall longitudinal extent of the catalytic converter component. The overall precious metal content may thus be kept low, since the third coating zone, having the lowest precious metal content, preferably constitutes at least 50% of the overall length.

In another embodiment of the invention, the precious metal content of the coating is determined by the elements platinum and palladium, the precious metal content being 12 g/ft$^3$ to 100 g/ft$^3$, based on the overall volume of the catalytic converter component. The average precious metal content is preferably 15 g/ft$^3$ to 50 g/ft$^3$. An average precious metal content is particularly preferably in the range of 25 g/ft$^3$ to 40 g/ft$^3$, as the result of which the catalytic converter component is particularly economical.

In another embodiment of the invention, the precious metals platinum and palladium are provided in the coating in a mass ratio of 1:5 to 5:1. A mass ratio of 1:2 to 2:1 is preferred. A mass ratio in the range of 1:1.5 to 1.5:1 is particularly preferred. This results in a high oxidation catalyst activity, in particular with regard to hydrocarbons.

In another embodiment of the invention, the precious metal content in the first coating zone is 60 g/ft$^3$ to 150 g/ft$^3$, in the second coating zone is 20 g/ft$^3$ to 60 g/ft$^3$, and in the third coating zone is 5 g/ft$^3$ to 15 g/ft$^3$. An embodiment having a precious metal content of approximately 80 g/ft$^3$ in the first coating zone, approximately 30 g/ft$^3$ in the second coating zone, and/or approximately 10 g/ft$^3$ in the third coating zone is particularly preferred. Due to the comparatively high precious metal content that is present solely on the input side, a high level of cost savings may be achieved. The precious metal content is preferably uniformly distributed in a particular coating zone with respect to its longitudinal extent; i.e., there is preferably no, or at best only a small, gradient present in a particular coating zone.

The use according to the invention of the catalytic converter component in an emission control system of a motor vehicle provides heating of exhaust gas by oxidizing hydrocarbons upstream from upstream from an arrangement in series in the emission control system of a particle filter and an SCR catalytic converter downstream from the particle filter. As corroborated by testing, reliable heating, in particular starting from low exhaust gas temperatures, over a very long usage period is made possible. This makes the catalytic converter component particularly suitable for use in corresponding emission control systems of utility vehicles, since utility vehicles are typically used until they have high mileage. It is thus necessary to be able to reliably carry out particle filter regenerations by thermal soot burnoff over the longest possible usage periods, which typically involve several hundred thousand kilometers. It is typically necessary to carry out forced exhaust gas heating to a temperature that is required for soot burnoff, for which purpose the catalytic converter component is used.

In addition, it is desirable to achieve stable conditions, over the longest possible usage period, with regard to nitrogen dioxide formation at the catalytic converter component due to oxidation of nitric oxide contained in the exhaust gas, which influences the activity of the SCR catalytic converter. This is likewise made possible by the catalytic converter component according to the invention. Due to the excellent long-term stability of the catalytic converter component, an initially high oxidation power in this regard, which is often provided for oxidation catalytic converters via high platinum contents, may be intentionally dispensed with in order to compensate for an aging-related decrease in the nitrogen oxides oxidation activity.

In one particularly preferred embodiment of the invention, the catalytic converter component is used for oxidizing hydrocarbons that are at least predominantly present as diesel fuel. In this case, the diesel fuel is added to the exhaust gas upstream from the catalytic converter component by vaporization and/or spraying, and is oxidized by the catalytic converter component in an exothermic reaction, thus heating the exhaust gas.

Another embodiment of the invention provides for use of the catalytic converter component in an emission control system which downstream from the particle filter has a two-part SCR catalytic converter in the emission control system, the SCR catalytic converter, viewed in the exhaust gas flow direction, having a first portion with an iron-containing zeolite, and a second portion, downstream therefrom, with a copper-containing zeolite. As corroborated by testing, a high nitrogen oxides conversion rate with simultaneous low slip of nitrogen dioxide ($NO_2$) is made possible due to a limited $NO_2$ formation capacity of the catalytic converter component in conjunction with the two-part SCR catalytic converter. The two catalytic converter portions are preferably formed by separate honeycombs. However, the zeolite coatings in question may also be provided contiguously on the same honeycomb.

Advantageous embodiments of the invention are illustrated in the drawings and described below. The features mentioned above and to be explained below may be used not only in the particular stated feature combination, but also in other combinations or alone without departing from the scope of the present invention.

BRIEF DESCRIPTION OF THE DRAWING FIGURES

Figure 2:
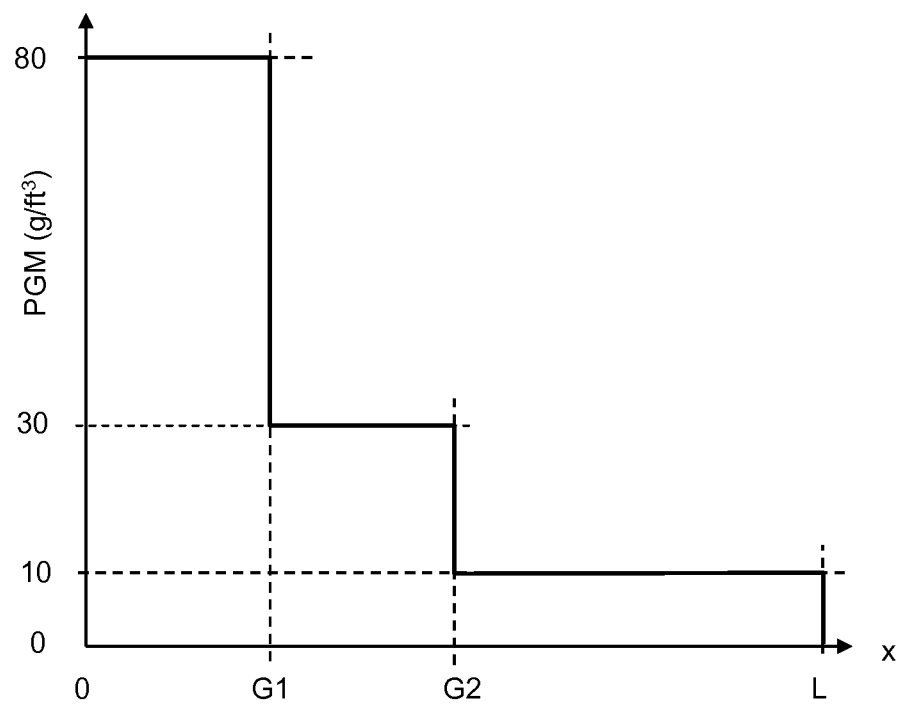
Figure 3:
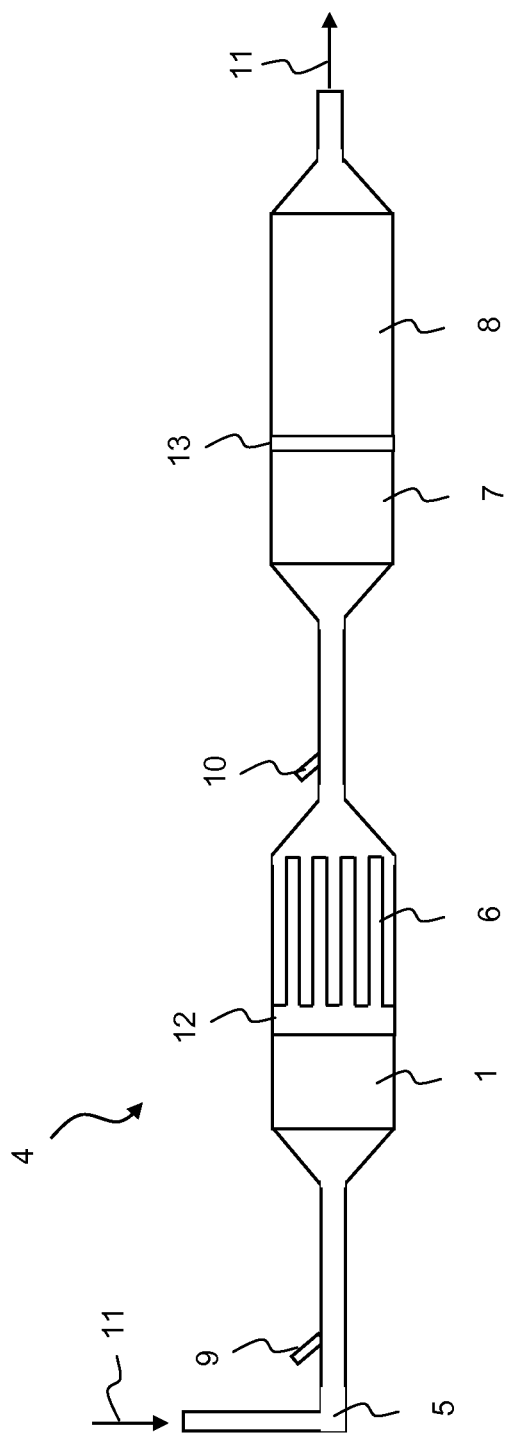

The drawings show the following:

FIG. 1 shows a schematic illustration of a catalytic converter component according to the invention, FIG. 2 shows a schematic diagram for explaining the precious metal coating of the catalytic converter component according to the invention, and FIG. 3 shows a schematic illustration of a preferred design of a motor vehicle emission control system in which the catalytic converter component according to the invention is used.

DETAILED DESCRIPTION

FIG. 1 schematically illustrates a catalytic converter component 1 according to the invention, as provided for use in an emission control system of a motor vehicle internal combustion engine, not illustrated. In the present case, the catalytic converter component 1 is designed as a honeycomb having an inlet-side end 2 and an outlet-side end 3 with respect to an exhaust gas inlet, and has a longitudinal extent of the length L, viewed in the exhaust gas flow direction. In the present case, the cross-section of the honeycomb is oval; however, a circular cross-section may also be provided. The honeycomb has continuous open channels, the walls of which include a coating having oxidation catalyst activity. The coating preferably contains only platinum and palladium with regard to precious metals of the platinum group, but in any case is free of rhodium. Preferably no other precious metals besides platinum and palladium are provided.

The catalytic converter component 1 according to the invention has a total of three coating zones one downstream from the other, viewed in the direction of longitudinal extent, having different contents of the precious metals platinum and palladium. The first coating zone has a length L1 and extends from the inlet-side end 2 to a first coating boundary G1. The second coating zone extends in the longitudinal direction from the coating boundary G1 to the coating boundary G2, and has a length L2. Directly following the second coating zone is a third coating zone having the length L3 and which extends to the outlet-side end 3 of the catalytic converter component 1. In one particularly preferred embodiment, the lengths L1 and L2 of the first and the second coating zones, respectively, each constitute approximately 25% of the overall length L. However, in each case length regions of 10% to 40% of the overall length L may also be provided for the first and second coating zones L1 and L2, respectively. The content of platinum and palladium is in the range of approximately 12 $g/ft^3$ to approximately 100 $g/ft^3$, based on the overall volume of the catalytic converter component 1, and is distributed differently over the three coating zones, as explained in greater detail below with reference to FIG. 2.

FIG. 2 depicts in schematic diagram form a precious metal content PGM (platinum group metal) of the coating of the catalytic converter component 1, expressed in the customary units of $g/ft^3$, as a function of the spatial coordinate x of the catalytic converter component 1 extending in the axial direction. Within a particular coating zone, the precious metal contents PGM of the coating are at least approximately constant over the particular length L1, L2, L3.

In the particularly preferred distribution illustrated here, the first coating provided for the first coating zone has a PGM value of the precious metal content of approximately 80 $g/ft^3$. However, a precious metal content PGM in the range of approximately 60 $g/ft^3$ to 150 $g/ft^3$ may be provided. In the present case, the precious metal content PGM of the third coating in the third coating zone has a PGM value of approximately 10 $g/ft^3$. However, a precious metal content PGM in the range of approximately 5 $g/ft^3$ to 15 $g/ft^3$ may be provided. In the present case, the middle, second coating zone that adjoins upstream from the first coating zone and downstream from the third coating zone has a second coating with a PGM value of approximately 30 $g/ft^3$. However, a precious metal content PGM in the range of approximately 20 $g/ft^3$ to 60 $g/ft^3$ may be provided. A mass ratio of platinum to palladium is preferably likewise constant in the coatings of the respective coating zones, and is in the range of 1:5 to 5:1, in particular in the range of 1:2 to 2:1, and particularly preferably between 1:1.5 and 1.5:1. A ratio of platinum to palladium is preferably selected which is at least approximately constant over the overall length L.

A preferred use of the catalytic converter component 1 according to the invention is discussed below with reference to FIG. 3.

FIG. 3 schematically illustrates a preferred embodiment of a motor vehicle emission control system 4. The emission control system 4 is preferably used for cleaning the exhaust gas from a utility vehicle diesel engine, not illustrated. In the present case, the emission control system 4 has an exhaust gas line 5 in which the above-described catalytic converter component 1, which is preferably designed as a diesel oxidation catalytic converter, a diesel particle filter 6, a first SCR catalytic converter 7, and a second SCR catalytic converter 8 are situated one downstream from the other in an exhaust gas flow direction denoted by the arrow 11. In the present case, the catalytic converter component 1 and the diesel particle filter 6 are situated at a short distance from one another in a shared first housing 12. The first SCR catalytic converter 7 and the second SCR catalytic converter 8 are likewise situated at a short distance from one another in a shared second housing 13. A configuration of the mentioned components in a shared combined emission control muffler box is likewise possible.

Provided upstream from the catalytic converter component 1 is a first reducing agent metering unit 9 via which a hydrocarbon-containing fuel, in particular diesel fuel, may be added to the exhaust gas in finely distributed form. Provided between the diesel particle filter 6 and the first SCR catalytic converter 7 is a second reducing agent metering unit 10 via which a reducing agent containing ammonia in free or bound form, in particular an aqueous urea solution, may be added to the exhaust gas in finely distributed form. Further components, such as exhaust gas sensors for oxygen, nitrogen oxides, and/or ammonia, are likewise preferably provided, but are not illustrated in greater detail for the sake of clarity.

The particle filter 6 is used to filter out particles, present in particular in the form of soot, from the exhaust gas, and may have a sintered metal design, or may be a wallflow filter unit having a honeycomb design. A catalytic coating preferably containing a coating material that promotes thermal soot burnoff is preferably provided for the particle filter 6.

The first SCR catalytic converter 7 has a first SCR coating, which in the present case includes an iron-containing zeolite, on a preferably ceramic honeycomb. This allows selective catalytic reduction of nitrogen oxides with excess oxygen. Ammonia supplied to the exhaust gas via the second metering unit 10 is used as reducing agent. The first SCR coating is preferably designed in such a way that good high-temperature activity, i.e., a particularly high nitrogen oxides conversion rate, at comparatively high temperatures is made possible. In addition, the iron-containing first zeolite coating generally allows a high level of catalytic activity, even with comparatively high nitrogen dioxide fractions of greater than 50% in the inflowing nitrogen oxides.

The second SCR catalytic converter 8 has a second SCR coating, which in the present case includes a copper-containing zeolite, on a preferably ceramic honeycomb. This likewise allows selective catalytic reduction of nitrogen oxides with excess oxygen. The second SCR coating is preferably designed in such a way that particularly good low-temperature activity is made possible. In addition, the copper-containing second zeolite coating generally allows high catalytic activity, even with comparatively low nitrogen dioxide fractions of much less than 50% in the inflowing nitrogen oxides. This has proven to be particularly advantageous, since the downstream second SCR catalytic converter 8 receives exhaust gas with a decreased nitrogen dioxide fraction due to the NOx conversion achieved by the first SCR catalytic converter 7. As a result of the decreased nitrogen dioxide fraction in the exhaust gas, particularly high selectivity of the second SCR catalytic converter with regard to reduction of nitrogen oxides to elemental nitrogen, i.e., particularly low formation of undesirable nitrous oxide, is provided.

Furthermore, due to the embodiment of the SCR catalytic converter having an upstream first portion with high-temperature activity and a downstream portion with low-temperature activity, a high level of catalytic activity of the combined SCR catalytic converter over a broad temperature range, and therefore compliance with the most stringent exhaust emission limits, is made possible.

In the present case, in the outflow-side area of the second SCR catalytic converter 8 a coating zone having an oxidation catalyst coating is provided, which is used primarily for the oxidation of ammonia in the event that ammonia slip occurs. This coating zone is applied on an outlet-side portion of the support body, which constitutes approximately 10% to 20% of the overall length of the second SCR catalytic converter 8. In the present case, the volume of the second SCR catalytic converter 8 corresponds at least to that of the first SCR catalytic converter 7. The second SCR catalytic converter 8 is preferably approximately two to three times larger than the first SCR catalytic converter 7. Although the embodiment having an iron-containing zeolite as the first SCR coating for the first SCR catalytic converter 7 and having a copper-containing zeolite as the second SCR coating for the second SCR catalytic converter 8 is regarded as preferred, for some applications it may also be provided to situate a copper-containing zeolite upstream from an iron-containing zeolite.

Recurring regeneration operations are provided for the particle filter 6, in which accumulated soot is removed by thermally induced soot burnoff, using oxygen. For this purpose, it is necessary to heat the particle filter 6 to a temperature required for the soot burnoff, typically above 550° C. Since such a high temperature is seldom reached during customary driving states, forced heating of the exhaust gas flowing into the particle filter 6 is necessary for regeneration of the particle filter 6. Primarily the catalytic converter component 1 is used to this end. In order to heat exhaust gas at the catalytic converter component 1, and thus the subsequent particle filter 6, for carrying out the regeneration, the first reducing agent metering unit 9 is activated. When the reducing agent metering unit 9 is active, diesel fuel, for example, is supplied to the exhaust gas, preferably with temperature regulation. The supplied diesel fuel oxidizes mainly at the catalytic converter component 1, so that a corresponding quantity of heat is released and the exhaust gas is thus heated.

Due to the design of the catalytic converter component 1 according to the invention explained in greater detail above, the catalytic activity necessary for oxidizing the diesel fuel is already present at low temperatures of approximately 250° C. The first coating present in the first coating zone allows early "start-up" of the oxidation of diesel fuel, as the result of which, starting from approximately 250° C. in the region of the first coating zone, temperatures of over 400° C. are rapidly achieved at that location. This allows oxidation catalyst activity to develop, even in the second coating that is present in the subsequent second coating zone and which has a lower precious metal content. This causes the temperature in this zone to further increase, typically to approximately 500° C. In turn, it is thus possible for oxidation catalyst activity to develop in the third coating which is present in the third coating zone and which has only a low precious metal content, thus achieving a further temperature increase to typically 550° C. or greater. The staged exhaust gas heating which occurs in the catalytic converter component 1 due to the zoned coating thereof thus allows reliable particle filter regeneration, even for driving conditions in the low-load range.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A catalytic converter component of a motor vehicle emission control system, the catalytic converter component comprising:
a honeycomb support body having channels extending in a longitudinal direction and through which gas may flow freely from an inlet-side end of the catalytic converter component to an outlet-side end of the catalytic converter component;
a catalytically active coating, having a precious metal content determined by at least one element of the platinum group, applied on channel walls of the honeycomb support body in a first, second, and third coating zone,
wherein the first coating zone has a first precious metal content and extends in the longitudinal direction from the inlet-side end to a first coating boundary situated between the inlet-side end and the outlet-side end,
wherein the second coating zone has a second precious metal content that is lower than the first precious metal content and extends in the longitudinal direction from the first coating boundary to a second coating boundary situated between the inlet-side end and the outlet-side end and downstream from the first coating boundary,
wherein the third coating zone has a third precious metal content that is lower than the second precious metal content and extends in the longitudinal direction from the second coating boundary to the outlet-side end, and
wherein the catalytically active coating is a coating having oxidation catalyst activity and is free of rhodium.

2. The catalytic converter component of claim 1, wherein the precious metal content of the catalytically active coating is determined by elements platinum and palladium, the precious metal content being between 12 $g/ft^3$ and 100 $g/ft^3$, based on an overall volume of the catalytic converter component.

3. The catalytic converter component of claim 2, wherein the precious metals platinum and palladium are provided in the coating in a mass ratio of 1:5 to 5:1.

4. The catalytic converter component of claim 1, wherein the precious metal content in the first coating zone is 60 $g/ft^3$ to 150 $g/ft^3$, in the second coating zone is 20 $g/ft^3$ to 60 $g/ft^3$, and in the third coating zone is 5 $g/ft^3$ to 15 $g/ft^3$.

5. The catalytic converter component of claim 1, wherein longitudinal extents of the first and the second coating zones are each 10% to 40% of an overall longitudinal extent of the catalytic converter component.

6. The catalytic converter component of claim 5, wherein the precious metal content of the catalytically active coating is determined by elements platinum and palladium, the precious metal content being between 12 $g/ft^3$ and 100 $g/ft^3$, based on an overall volume of the catalytic converter component.

7. The catalytic converter component of claim 6, wherein the precious metals platinum and palladium are provided in the coating in a mass ratio of 1:5 to 5:1.

8. The catalytic converter component of claim 5, wherein the precious metal content in the first coating zone is 60 $g/ft^3$ to 150 $g/ft^3$, in the second coating zone is 20 $g/ft^3$ to 60 $g/ft^3$, and in the third coating zone is 5 $g/ft^3$ to 15 $g/ft^3$.

* * * * *